Dec. 23, 1969 C. M. SCHADE 3,486,028

PHOTON AMPLIFIER INCLUDING ELECTROLUMINESCENT DIODE

Filed Sept. 21, 1966

INVENTOR
CRISTY M. SCHADE
BY A. C. Smith
ATTORNEY

United States Patent Office 3,486,028
Patented Dec. 23, 1969

3,486,028

PHOTON AMPLIFIER INCLUDING ELECTRO-LUMINESCENT DIODE

Cristy M. Schade, Woodside, Calif., assignor to Hewlett-Packard Company, Palo Alto, Calif., a corporation of California Filed Sept. 21, 1966, Ser. No. 580,923
Int. Cl. H01j 39/12; G02f 1/28
U.S. Cl. 250—213 1 Claim

ABSTRACT OF THE DISCLOSURE

An electronic circuit for amplifying an incident photon signal uses the non-linear unidirectional conductivity characteristics of an electroluminescent diode to expand the dynamic range of an incident photon signal and provide variable threshold sensitivity and contrast enhancement not heretofore possible using conventional AC electroluminors.

SUMMARY OF THE INVENTION

The circuit includes the serial connection of a photoconductive element, an electroluminescent diode and a bias supply and the electroluminescent diode is shunted with a resistive device of selectable value to alter the level of control current applied to the electroluminescent diode over the operating range from low-level to high-level input photon signals.

Other and incidental objects of the present invention will be apparent from a reading of this specification and an inspection of the accompanying drawing in which.

Figure 1:
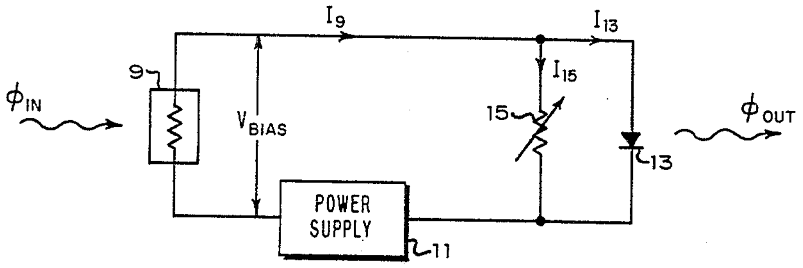
FIGURE 1 is a schematic diagram of the photon amplifier of the present invention.
Figure 2:
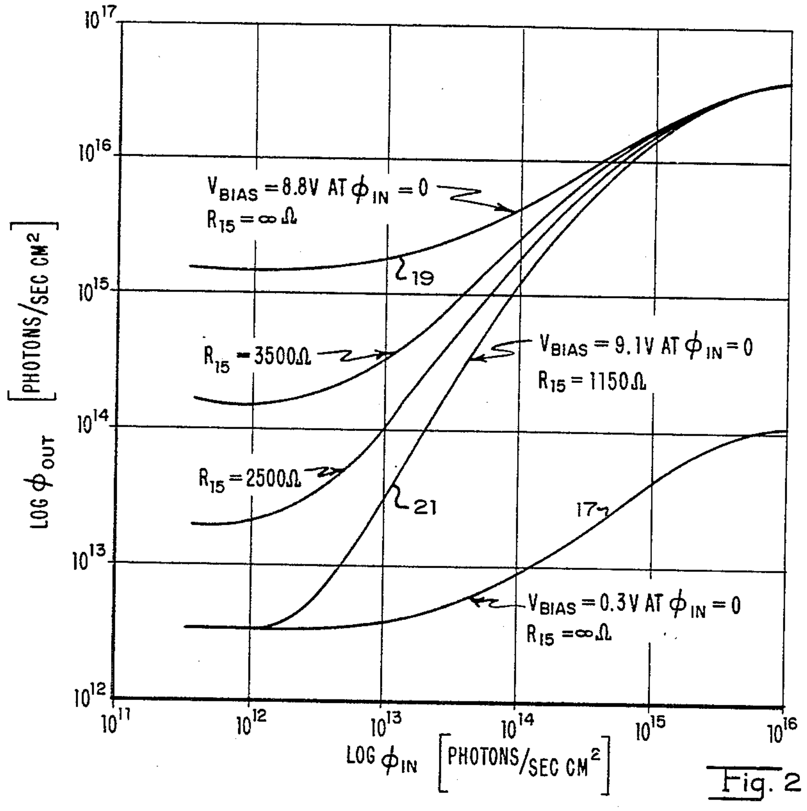
FIGURE 2 is a graph showing the bias conditions in the operation of the circuit of FIGURE 1.

Referring now to FIGURES 1 and 2, there is shown a photoconductor element 9 connected in a series circuit with a bias supply 11 and an electroluminescent diode 13. A photon signal, $\varphi_{in}$ (e.g., a visible or invisible light input), incident on the photoconductor element 9 controls the current supplied by supply 11 in the forward direction through the electroluminescent diode 13. In the circuit of FIGURE 1 with no shunting resistor 15 (i.e., $R\rightarrow\infty$), and at low bias voltages, $V_{bias}$, across the photoconductor 9 in the absence of incidental photon signal, a change of over four orders of magnitude in the level of incident photon signal $\varphi_{in}$ produces a change of output photon signal $\varphi_{out}$ of about one order of magnitude, as shown by curve 17 of FIGURE 2. A similar result is obtained for a high bias voltage across the photoconductor 9 in the absence of applied photon signal $\varphi_{in}$, as shown by curve 19 of FIGURE 2. Curves 17 and 19 thus represent typical operating limits, i.e., curve 17 represents the output of the electroluminescent diode 13 limited by the maximum current that can be drawn through the photoconductor 9 and diode 13 on low bias voltage and curve 19 represents the output of electroluminescent diode 13 where the minimum is determined by the current passed by the photoconductor 9 in the dark. Photon amplification (i.e., where $\varphi_{out}$ is at a higher level than $\varphi_{in}$ for all levels of $\varphi_{in}$) by the circuit of FIGURE 1 without the resistor 15 connected across the electroluminescent diode 13 only occurs at the higher bias voltages, $V_{bias}$, as shown by curve 19 and does not occur for all levels of $\varphi_{in}$ at lower bias voltages, as shown by curve 17. It has been discovered that by adding resistor 15 of selected finite value in shunt with electroluminescent diode 13 and by using approximately the same bias voltage as is used to plot curve 19 of the graph of FIGURE 2, the dynamic range of the photon output $\varphi_{out}$ is expanded substantially to the dynamic range of the input photon signal $\varphi_{in}$, as shown by curve 21 of FIGURE 2. In addition, the photon output signal $\varphi_{out}$ is a higher level signal than the incident photon signal $\varphi_{in}$, thereby providing true photon amplification over a wide dynamic range of $\varphi_{in}$ signal levels.

Figure 3:
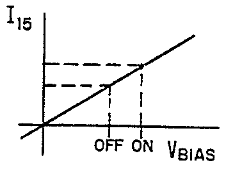
FIGURE 3 is a graph showing the I–V characteristics of a linear resistor.
Figure 4:
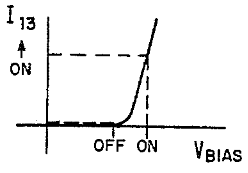
FIGURE 4 is a graph showing the I–V characteristics of a diode.
Figure 5:
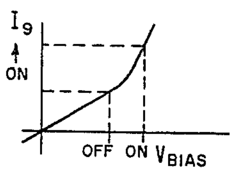
FIGURE 5 is a graph showing the I–V characteristics of the parallel combination of the electroluminescent diode and resistor of FIGURE 1.

It is believed that the effect described above which increases dynamic range of applied signal and provides adjustable contrast is due to the varying current division between the electroluminescent diode 13 and the resistor 15 as the level of signal applied to the photoconductor 9. As can be seen in FIGURE 1, for a given output ($\varphi_{out}$) there is a corresponding current ($I_{13}$) through the electroluminescent diode 13. For the no-signal or "off" operating condition, there is an optimum $V_{bias}$ such that the gain of the system will be a maximum at that point. This value of bias voltage ($V_{bias}$) and the dark resistance of the photoconductor provides a certain dark current ($I_9$). A given value of shunting resistor 15 will provide a corresponding current ($I_{13}$) through the electroluminescent diode 13 to set the minimum tolerable $\varphi_{out}$ (see FIGURES 3, 4 and 5 for the current division in the "off" position). Now a small voltage change across the parallel elements 13 and 15 causes a significant change in the current division between the elements 13 and 15 as can be seen from FIGURES 3, 4 and 5.

This represents a rapid increase in the amount of current that flows through the electroluminescent diode 13 as the level of applied signal increases. This produces a rapid change in $\varphi_{out}$ [$\varphi_{out}$ is a function of $I_{13}$] for changes in the level of applied signal such that the relative contrast at a predetermined operating point can be set by the value of the shunting resistor 15.

The value of resistor 15 required for the operation of the circuit of FIGURE 1 as described above is typically about 1000 to 5000 ohms and may be determined empirically knowing the following variables: (1) the minimum tolerable output level (i.e., $\varphi_{out}$ when $\varphi_{in}$ equals zero), (2) the required gain of the system, (the gain element is the photoconductor and its gain is proportional to the voltage drop across it), (3) the power limitations of the circuit (i.e., values of I and V the photoconductor can tolerate without being damaged), (4) the values of optical contrast, $\gamma$, that are desired for different values of $\varphi_{in}$ $$\left(\gamma=\frac{d(\log \varphi_{out})}{d(\log \varphi_{in})}\right)$$

The value of resistor 15 is thus empirically chosen knowing the selected value of bias voltage which will not supply too high a current through the unilluminated photoconductor 9 (thereby establishing the minimum tolerable output level from diode 13) and which will not supply power to the photoconductor 9 in excess of its power rating under operating conditions of high level illumination. Under high-level input signal conditions, the value of resistor 15 should be very much larger than the resistance value of the heavily conducting diode 13 (typically 20-100 ohms) so that substantially all of the photoconductor current is conducted by the diode 13. However, under no input signal operating conditions, the value of resistor 15 should be very much smaller than the diode resistance (typically about $10^4$ or $10^5$ ohms) so that the current conducted through the unilluminated photoconductor 9 is conducted substantially entirely through the resistor 15.

I claim:

1. Signalling circuit comprising:

a radiation-responsive signal conductor, a signal-controlled radiation-emitting electroluminescent diode and a source of unidirectional potential serially connected for controlling the radiation emitted by said diode in response to radiation incident to said conductor, said source of unidirectional potential being connected for supplying current in the forward conduction direction through said electroluminescent diode, and a resistive element connected in shunt with said radiation-emitting diode and having a resistance value which is within the range of operating resistances of the electroluminescent diode and which is substantially greater than the minimum operating resistance thereof.

References Cited

UNITED STATES PATENTS

| | | |
|---|---|---|
| 3,210,549 | 10/1965 | Van Santen et al. |
| 3,248,552 | 4/1966 | Bryan. |

OTHER REFERENCES

Greenberg, Electronics, "Electroluminescent Display and Logic Devices," Mar. 24, 1961, pp. 31–35.

Whetstone, Review of Scientific Instruments, "Millimicrosecond Light Source," vol. 30, No. 6, June 1959, pp. 447–450.

Lamorte et al., Electronics, "P-N Junctions As Radiation Sources," vol. 37, No. 20, July 13, 1964, pp. 61–65.

ARCHIE R. BORCHELT, Primary Examiner

C. M. LEEDOM, Assistant Examiner

U.S. Cl. X.R.

250—217; 315—158